(12) United States Patent
Rahman

(10) Patent No.: US 12,389,215 B2
(45) Date of Patent: Aug. 12, 2025

(54) WiFi CALL IDENTIFICATION FOR ROAMING SUBSCRIBERS

(71) Applicant: T-Mobile USA, Inc., Bellevue, WA (US)

(72) Inventor: Muhammad Tawhidur Rahman, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 329 days.

(21) Appl. No.: 17/876,279

(22) Filed: Jul. 28, 2022

(65) Prior Publication Data
US 2024/0040361 A1 Feb. 1, 2024

(51) Int. Cl.
*H04W 8/12* (2009.01)
*H04W 4/16* (2009.01)
*H04W 64/00* (2009.01)
*H04W 76/25* (2018.01)

(52) U.S. Cl.
CPC .............. *H04W 8/12* (2013.01); *H04W 4/16* (2013.01); *H04W 64/00* (2013.01); *H04W 76/25* (2018.02)

(58) Field of Classification Search
None
See application file for complete search history.

(56) References Cited

U.S. PATENT DOCUMENTS

| | | | |
|---|---|---|---|
| 6,075,783 A | 6/2000 | Voit | |
| 6,359,880 B1 | 3/2002 | Curry et al. | |
| 6,393,014 B1 | 5/2002 | Daly et al. | |
| 6,839,338 B1 | 1/2005 | Amara et al. | |
| 6,920,487 B2 | 7/2005 | Sofer et al. | |
| 6,931,249 B2 | 8/2005 | Fors et al. | |
| 6,950,876 B2 | 9/2005 | Bright et al. | |
| 6,954,790 B2 | 10/2005 | Forsloew | |
| 7,076,251 B2 | 7/2006 | Jagadeesan et al. | |
| 7,161,929 B1 | 1/2007 | Oneill et al. | |
| 7,184,764 B2 | 2/2007 | Raviv et al. | |
| 7,215,959 B2 | 5/2007 | Creamer et al. | |
| 7,218,618 B2 | 5/2007 | Greis et al. | |
| 7,330,453 B1 | 2/2008 | Borella et al. | |
| 7,339,903 B2 | 3/2008 | Oneill | |
| 7,379,436 B2 | 5/2008 | Jiang | |
| 7,383,042 B2 | 6/2008 | Lamb et al. | |
| 7,389,412 B2 | 6/2008 | Sharma et al. | |
| 7,496,090 B2 | 2/2009 | Jiang | |

(Continued)

OTHER PUBLICATIONS

International Searching Authority, International Search Report and Written Opinion, PCT Patent Application PCT/US2023/027946, mailed Nov. 9, 2023, 11 pages.

*Primary Examiner* — Phirin Sam
(74) *Attorney, Agent, or Firm* — Perkins Coie LLP

(57) ABSTRACT

Systems, methods, and devices that relate to geo-location determination of roaming Wi-Fi calling are disclosed. In one example aspect, a method for wireless communication includes transmitting, by a first network element in a home network, a message to a second network element indicating an establishment of a roaming voice session using a non-cellular network access technology. The message includes an Internet Protocol (IP) address allocated to a terminal device. The method also includes determining, by the first network element in the home network, a geographical location of the roaming voice session based on the IP address allocated to the terminal device.

20 Claims, 11 Drawing Sheets

(56) References Cited

U.S. PATENT DOCUMENTS

| | | |
|---|---|---|
| 7,496,103 B1 | 2/2009 | Sayers et al. |
| 7,567,804 B1 | 7/2009 | Mangal |
| 7,609,682 B2 | 10/2009 | Ang et al. |
| 7,639,157 B1 | 12/2009 | Whitley et al. |
| 7,664,494 B2 | 2/2010 | Jiang |
| 7,738,453 B2 | 6/2010 | Binder |
| 7,738,488 B2 | 6/2010 | Marsico et al. |
| 8,009,641 B2 | 8/2011 | Grech et al. |
| 8,195,778 B1 | 6/2012 | Leung et al. |
| 8,204,044 B2 | 6/2012 | Lebizay |
| 8,238,905 B2 | 8/2012 | Jiang |
| 8,306,560 B2 | 11/2012 | Krause et al. |
| 8,553,662 B2 | 10/2013 | Chen et al. |
| 8,607,309 B2 | 12/2013 | Ropolyi et al. |
| 8,611,309 B2 | 12/2013 | Wang et al. |
| 8,626,156 B2 | 1/2014 | Marsico |
| 8,638,717 B2 | 1/2014 | Chen et al. |
| 8,750,863 B2 | 6/2014 | Shah |
| 8,787,174 B2 | 7/2014 | Riley et al. |
| 8,799,440 B2 | 8/2014 | Zhou et al. |
| 8,831,014 B2 | 9/2014 | Koodli et al. |
| 8,914,526 B1 | 12/2014 | Lindquist et al. |
| 8,958,348 B2 | 2/2015 | Patel et al. |
| 9,270,596 B2 | 2/2016 | Parker |
| 9,491,686 B2 | 11/2016 | Bosch et al. |
| 9,788,188 B2 | 10/2017 | Xu et al. |
| 9,807,602 B2 | 10/2017 | Cherian et al. |
| 9,867,098 B2 | 1/2018 | Kwok et al. |
| 9,924,344 B1 | 3/2018 | Datar |
| 9,986,414 B1 | 5/2018 | Mangal et al. |
| 10,306,579 B2 | 5/2019 | Zhang et al. |
| 11,943,820 B2 * | 3/2024 | John ............... H04W 76/10 |
| 2004/0072593 A1 | 4/2004 | Robbins et al. |
| 2006/0121916 A1 | 6/2006 | Aborn et al. |
| 2007/0254648 A1 | 11/2007 | Zhang et al. |
| 2008/0009262 A1 | 1/2008 | Rudolf et al. |
| 2008/0108347 A1 * | 5/2008 | Jiang ............... H04W 60/00 |
| | | 455/433 |
| 2016/0295386 A1 | 10/2016 | Faccin et al. |
| 2019/0013967 A1 * | 1/2019 | Ishii ............... H04L 12/4641 |
| 2019/0036888 A1 * | 1/2019 | Pularikkal ........ H04L 63/0236 |
| 2019/0037339 A1 * | 1/2019 | Liu ..................... H04W 4/02 |
| 2019/0069338 A1 | 2/2019 | Kiss et al. |
| 2020/0221381 A1 * | 7/2020 | Homchaudhuri ................ H04W 52/0235 |
| 2021/0068019 A1 * | 3/2021 | Cuevas Ramirez ............. H04W 36/385 |
| 2021/0314858 A1 | 10/2021 | Wong et al. |
| 2021/0385735 A1 * | 12/2021 | Chin ............... H04W 36/1443 |
| 2022/0217519 A1 * | 7/2022 | Kim ..................... H04L 69/40 |
| 2022/0240131 A1 * | 7/2022 | Yang ............... H04W 28/0252 |
| 2022/0386114 A1 * | 12/2022 | Fajri ............... H04L 67/565 |
| 2022/0408351 A1 * | 12/2022 | Poovappa ............. H04M 7/006 |
| 2023/0284006 A1 * | 9/2023 | Menon ............... H04W 76/10 |
| | | 455/433 |
| 2023/0379856 A1 * | 11/2023 | Ryu ..................... H04W 60/04 |

* cited by examiner

WiFi CALL IDENTIFICATION FOR ROAMING SUBSCRIBERS

BACKGROUND

Mobile communication technologies are moving the world toward an increasingly connected and networked society. The use of wireless broadband network in connection with cellular network for voice calling is gaining popularity among users for its convenience and affordable pricing.

Figure 1:
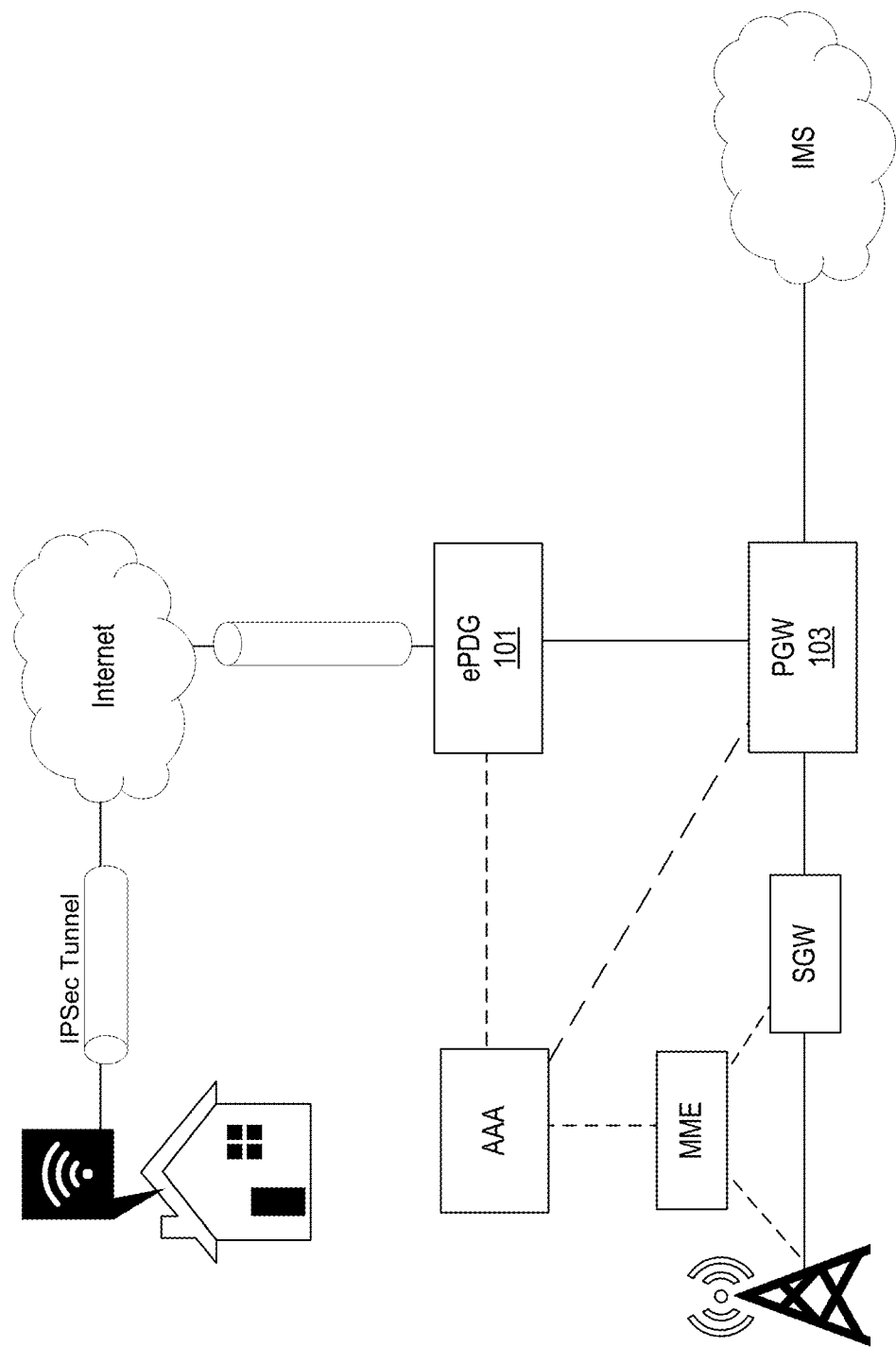
FIG. 1 illustrates an example architecture of Wi-Fi calling in the Long-Term Evolution (LTE) wireless systems.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Voice over wireless Local Area Network (VoWLAN), also known as WiFi calling, is the use of a wireless broadband network according to the IEEE 802.11 standards for the purpose of voice conversation. With Wi-Fi Calling, a user can make or receive a phone call if a Wi-Fi connection is available in an area where there is little or no cellular coverage. Wi-Fi calling can also be particularly desirable for international roaming users because often times international Wi-Fi calls are much more affordable than roaming voice calls using the cellular network.

International roaming calls using Wi-Fi network is gaining popularity due to its low cost and wide availability. The ability to track the locations of the roaming Wi-Fi calls can allow network operators to gain insights into the usage pattern of roaming Wi-Fi calling and provide better experiences to the users. In one example aspect, a method for wireless communication includes tracking a local Internet Protocol (IP) address allocated to a terminal device to determine the geolocation of the terminal device that corresponds to the IP address. The geolocation of the terminal device can be added to other network metrics to enable network operators to determine the performance of roaming Wi-Fi calling on a per country level.

FIG. 1 illustrates an example architecture 100 of Wi-Fi calling in the Long-Term Evolution (LTE) wireless systems. As shown in FIG. 1, access to the LTE network from an untrusted WLAN is provided through the evolved Packet Data Gateway (ePDG) 101. The control plane signaling between ePDG 101 and Packet Data Network Gateway (PGW) 103 uses the General Packet Radio Service (GPRS) Tunneling Protocol (GTP) and establishes bearers for user sessions. For each UE session established over untrusted WLAN, an Internet Protocol Security (IPsec) tunnel terminates at the ePDG 101 and a corresponding GTP tunnel is established to the PGW 103.

Figure 2:
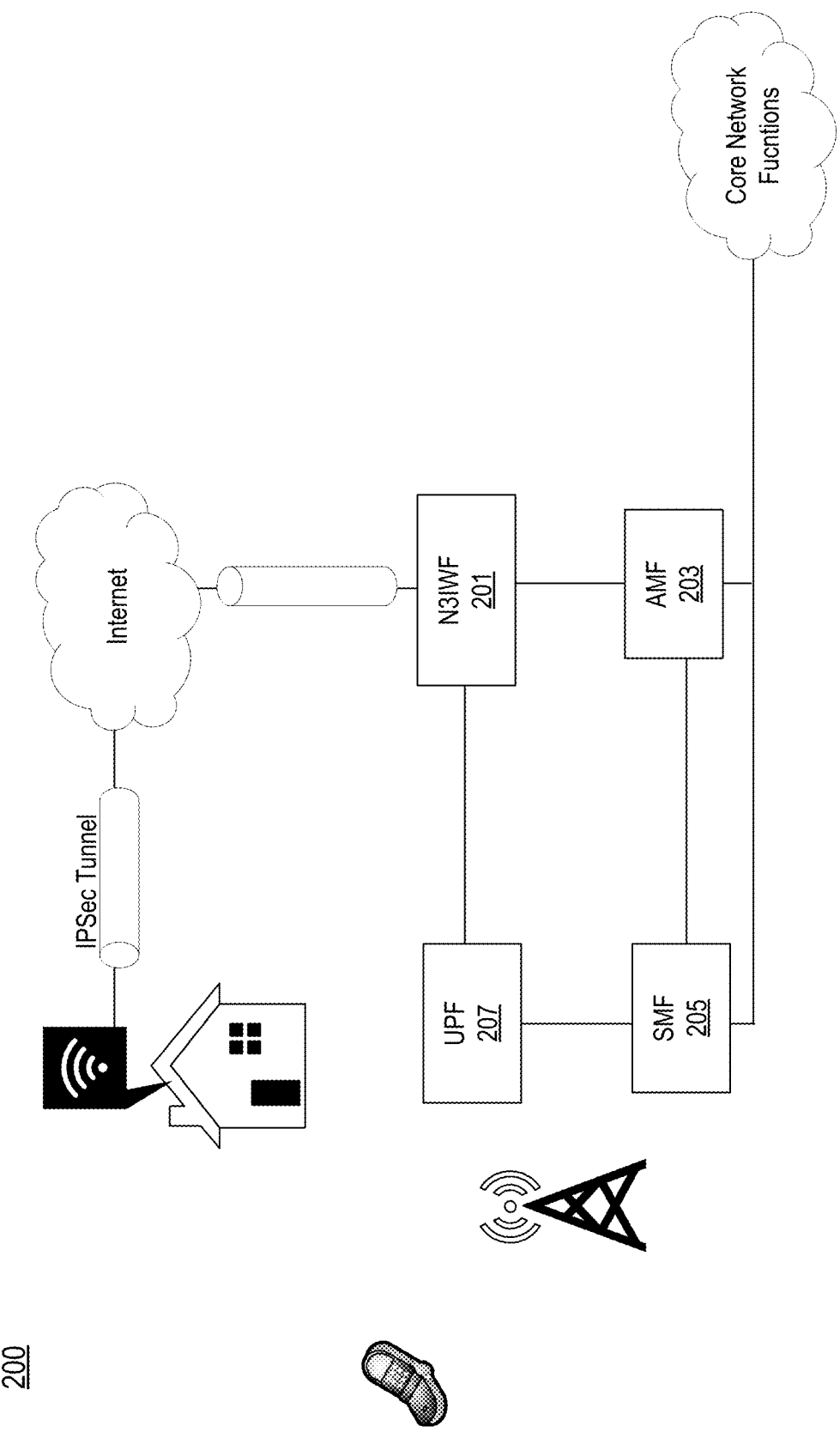
FIG. 2 illustrates an example architecture of Wi-Fi calling in the Fifth-Generation (5G) wireless systems.

FIG. 2 illustrates an example architecture 200 of Wi-Fi calling in the Fifth-Generation (5G) wireless systems. A UE accessing the 5G core network through an untrusted WLAN supports Non-Access Stratum (NAS) signaling. The UE initially registers and authenticates with the 5G core network using the N3IWF 201. For untrusted WLAN, the Access and Mobility Function (AMF) 203 is used to register the UE. Before the end of registration procedure, an IPsec security association is setup between the UE and N3IWF 201 for securing the NAS mobility and session management messages. The UE also establishes Protocol Data Unit (PDU) sessions using the IPsec signaling with the Session Management Function (SMF) 205 via the AMF. During the establishment of a PDU session, the N3IWF 201 sets up IPsec child security associations with the UE for various Quality of Service (QoS) flows corresponding to the PDU session and a GTP tunnel with the User Plane Function (UPF) 207.

With the increasing prevalence of international Wi-Fi calls, there is a need for network operators to analyze Wi-Fi calling usage across different countries to provide better understanding of the usage pattern, thereby improving services for international roaming users. However, it has been difficult to identify the Wi-Fi calling sessions accurately at a per country/geographic location level. Because Wi-Fi calls are not connected to cellular network for IP Multimedia Subsystem (IMS) access and are not anchored via cellular networks in foreign/visited networks, once the access to the LTE/5G network is established, the foreign network cannot convey the location information via information elements, such as the Mobile Country Code (MCC) and/or the Mobile Network Code (MNC).

This patent discloses techniques that can be implemented in various embodiments to enable network operators to determine in which country a Wi-Fi call originates. In some embodiments, the originating location of the Wi-Fi call can be determined based on correlating co-existing cellular data (e.g., when the UE uses cellular data in parallel with Wi-Fi calling) that can be tracked by the home network. In some embodiments, such as when cellular access is not available, UEs can be configured to select an ePDG/N3IWF in the home network. The gPDG/N3IWF functions as a home network anchor for the roaming Wi-Fi call so as to track the UE's local IP address in the visited network. In some embodiments, these techniques can be combined to provide a more accurate determination of the originating location of the Wi-Fi call.

In some embodiments, a UE has roaming cellular access in a foreign country, but the user may choose to perform Wi-Fi calling for its affordable price. In those scenarios, the UE can have a data connection with the 3GPP cellular network that co-exist with Wi-Fi calling using non-3GPP network access. Network elements such as the PGW (e.g., shown in FIG. 1) and the AMF (e.g., shown in FIG. 2) are aware of signaling and event records of both the data session via 3GPP network access and the call session via non-3GPP network access. The underlaying call flow of activating locational information (e.g., Data Access Point Name (APN)) from foreign cellular network can reach the home country core network GW nodes (e.g., PGW). Based on information such as temporal proximity and/or UE identification, the PGW/AMF can correlate information about the 3GPP data access with the non-3GPP voice access. The core network can determine the country and/or region of the UE that makes the Wi-Fi call, thereby providing per country/region analysis of Wi-Fi calling usage.

Figure 3:
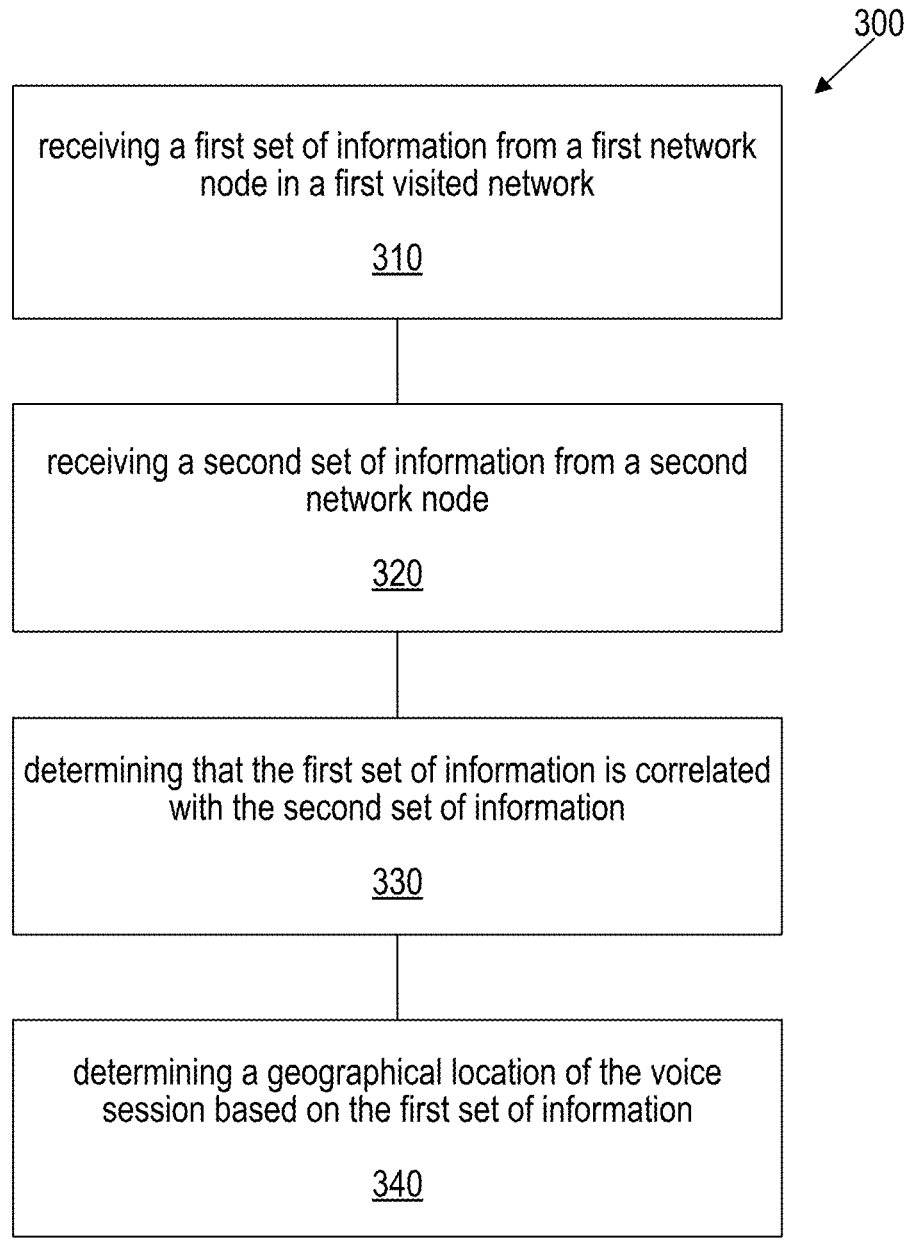
FIG. 3 is a flowchart representation of a process for wireless communication in accordance with one or more embodiments of the present technology.

FIG. 3 is a flowchart representation of a process 300 for wireless communication in accordance with one or more embodiments of the present technology. The process 300 includes, at operation 310, receiving, by a network element in a home network, a first set of information from a first network node in a first visited network. The first set of information is associated with a data access by a terminal device using a cellular network. The process 300 includes, at operation 320, receiving, by the network element in the home network, a second set of information from a second network node in a second visited network. The second set of information is associated with a roaming voice session by the terminal device using a non-cellular network. The process 300 includes, at operation 330, determining, by the network element in the home network, that the first set of information is correlated with the second set of information. The process 300 also includes, at operation 340, determining a geographical location of the roaming voice session based on the first set of information associated with the data access by the terminal device. Details related to process 300 are described in following examples using the 5G system architecture. However, the discloses techniques are similarly appliable to LTE wireless communication systems.

Figure 4A:
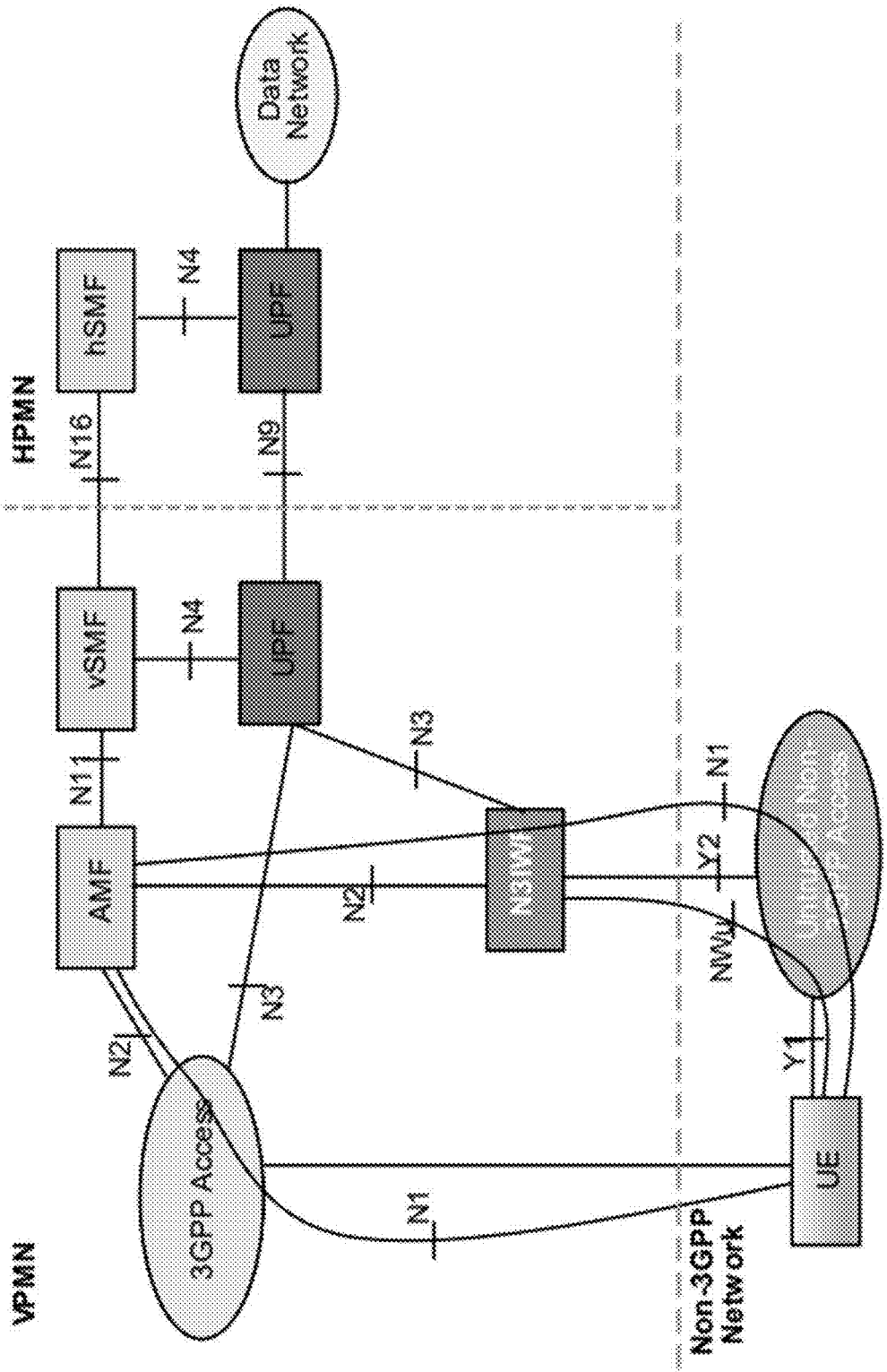
FIG. 4A illustrates an example architecture of untrusted non-3GPP access for Home Roaming (HR) scenario with Non-3GPP Interworking Function (N3IWF) in a same visited network as 3GPP access in accordance with one or more embodiments of the present technology.

FIG. 4A illustrates an example architecture of untrusted non-3GPP access for Home Roaming (HR) scenario with N3IWF in a same visited network as 3GPP access in accordance with one or more embodiments of the present technology. In this example, a roaming UE has coexisting 3GPP access (e.g., data access) and untrusted non-3GPP access (e.g., Wi-Fi calling) offered by a same foreign network operator. A network element in the Home Public Mobile Network (HPMN) (e.g., the UPF in HPMN) receives a first set of information from a first network node in the Visited Public Mobile Network (VPMN) (e.g., the UPF in VPMN). The first set of information can include the UE identity and the Cell Global Identity (CGI), indicating the geolocation of the UE. The network element (e.g., the UPF in HPMN) also receives a second set of information from the N3IWF in the VPMN via the first network node (e.g., the UPF in VPMN), indicating a voice session using untrusted non-3GPP access (e.g., Wi-Fi calling). The network element (e.g., the UPF in HPMN) can correlate the first set of information with the second set of information based on UE identity and/or the temporal proximity of these sets of information. The network element then derives the geographical location associated with the untrusted non-3GPP access (e.g., Wi-Fi calling) based on the geolocation of the UE extracted from information of the 3GPP data access.

Figure 4B:
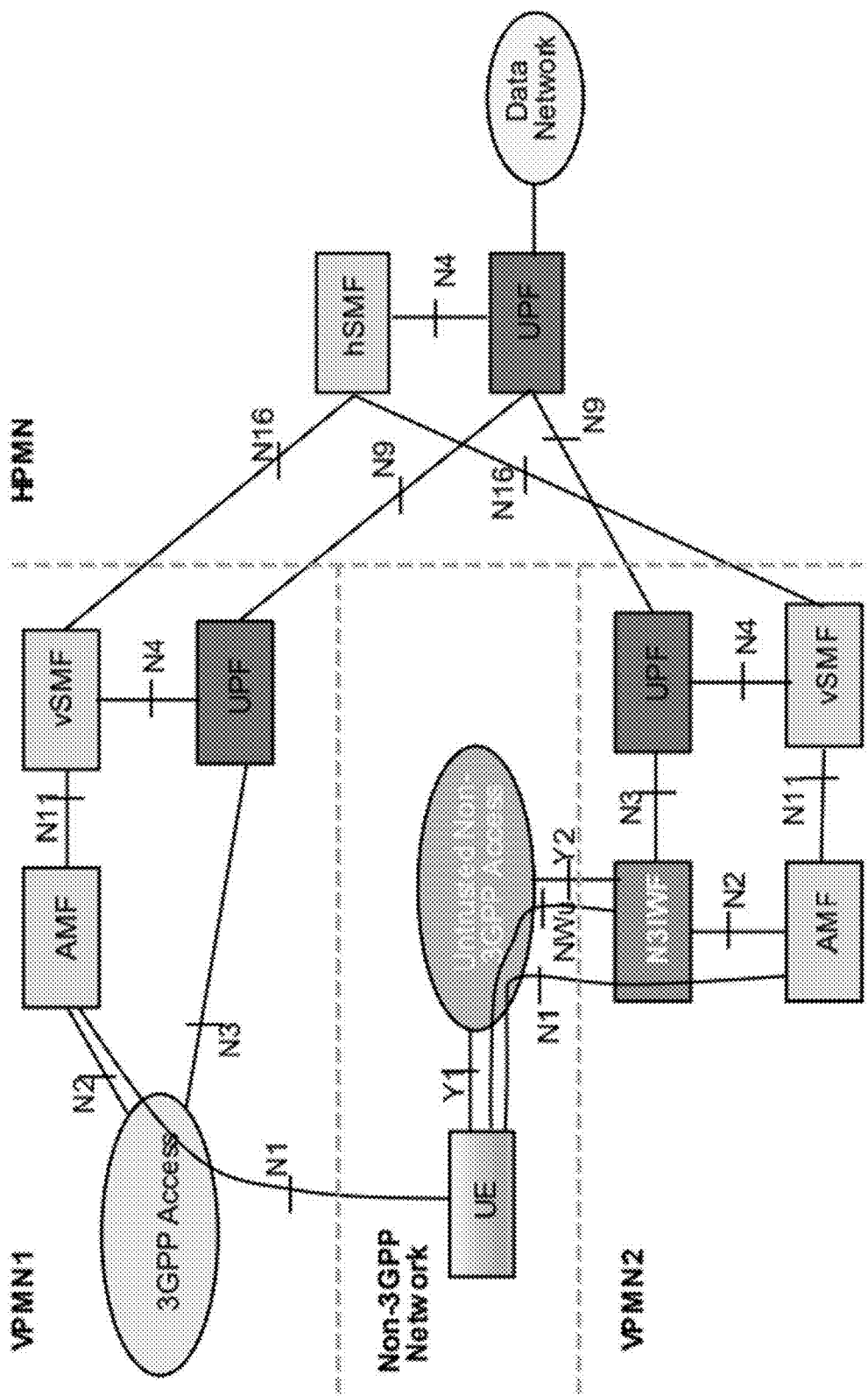
FIG. 4B illustrates an example architecture of untrusted non-3GPP access for HR scenario with N3IWF in different networks for 3GPP access in accordance with one or more embodiments of the present technology.

FIG. 4B illustrates an example architecture of untrusted non-3GPP access for HR scenario with N3IWF in different networks for 3GPP access in accordance with one or more embodiments of the present technology. In this example, a roaming UE has coexisting 3GPP access (e.g., data access) and untrusted non-3GPP access (e.g., Wi-Fi calling) offered by different network operators. For example, the roaming UE can gain cellular access by a first foreign network operator (e.g., Canada Bell) and also has Wi-Fi access in a local shopping mall (e.g., provided by Rogers). A network element in the HPMN (e.g., the UPF in HPMN) receives a first set of information from a first network node in a first VPMN (e.g., the UPF in VPMN1). The first set of information can include the UE identity and the CGI, indicating the geolocation of the UE. The network element (e.g., the UPF in HPMN) also receives a second set of information from a second network node in a second VPMN (e.g., the UPF in VPMN2), indicating a voice session using untrusted non-3GPP access (e.g., Wi-Fi calling). The network element (e.g., the UPF in HPMN) can correlate the first set of information with the second set of information based on UE identity and/or the temporal proximity of these sets of information. The network element then derives the geographical location associated with the untrusted non-3GPP access (e.g., Wi-Fi calling) based on the geolocation of the UE extracted from information of the 3GPP data access.

Figure 4C:
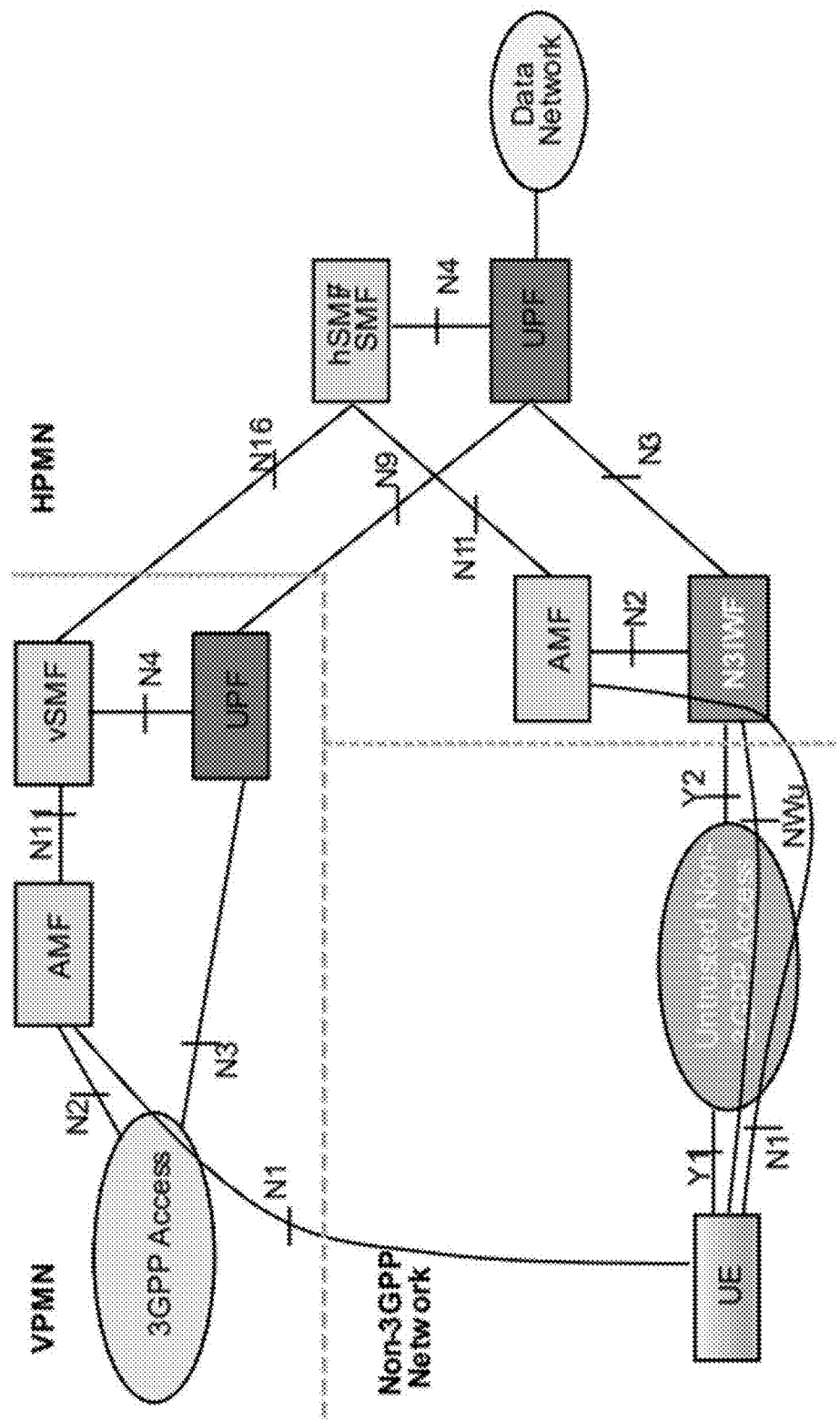
FIG. 4C illustrates an example architecture of untrusted non-3GPP access for HR scenario with N3IWF in the home network in accordance with one or more embodiments of the present technology.

FIG. 4C illustrates an example architecture of untrusted non-3GPP access for HR scenario with N3IWF in the home network in accordance with one or more embodiments of the present technology. In this example, a roaming UE has coexisting 3GPP access (e.g., data access) and untrusted non-3GPP access (e.g., Wi-Fi calling). The roaming UE can gain cellular access by a first foreign network operator (e.g., Canada Bell) and can select an N3IWF in the HPMN for establishing the Wi-Fi call session. A network element in the HPMN (e.g., the UPF in HPMN) receives a first set of information from a first network node in a first VPMN (e.g., the UPF in VPMN). The first set of information can include the UE identity and the CGI, indicating the geolocation of the UE. The network element (e.g., the UPF in HPMN) also receives a second set of information from the N3IWF, indicating a voice session using untrusted non-3GPP access (e.g., Wi-Fi calling). The network element (e.g., the UPF in HPMN) can correlate the first set of information with the second set of information based on UE identity and/or the temporal proximity of these sets of information. The network element then derives the geographical location associated with the untrusted non-3GPP access (e.g., Wi-Fi calling) based on the geolocation of the UE extracted from information of the 3GPP data access.

Figure 5:
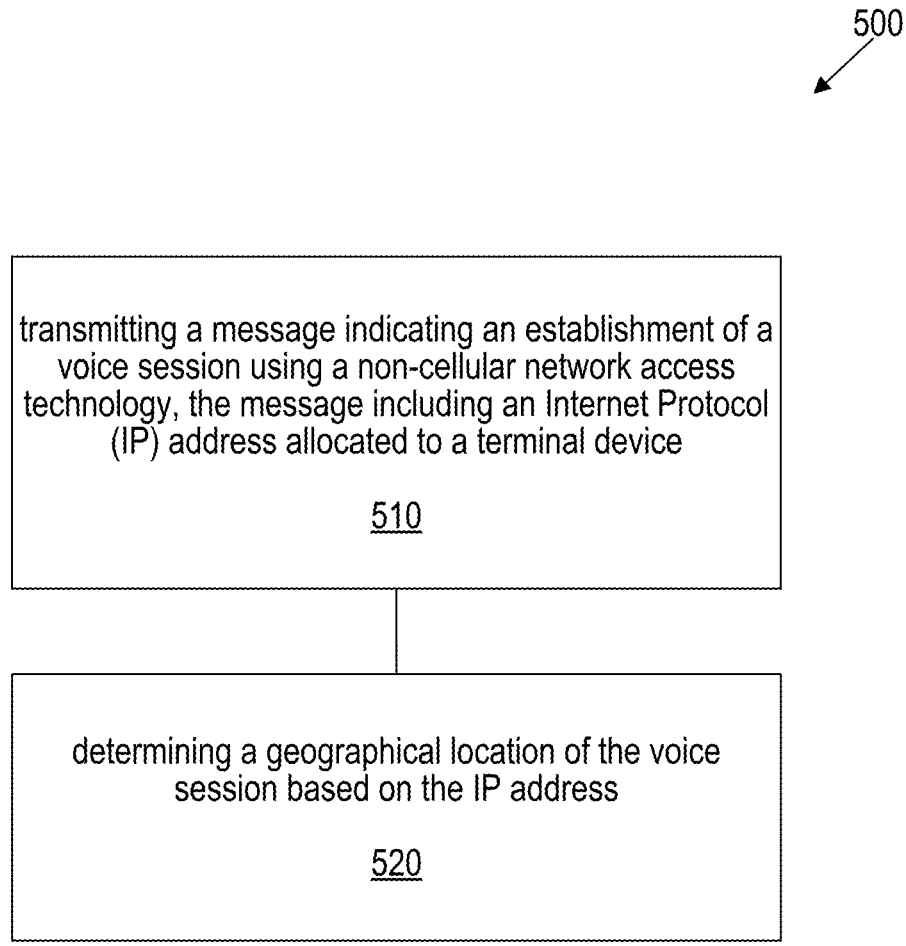
FIG. 5 is a flowchart representation of a process for wireless communication to independently determine a User Equipment (UE)'s Internet Protocol (IP) address in the non-3GPP access network in accordance with one or more embodiments of the present technology.

Sometimes, the user may disable cellular data access to avoid the high roaming charges. In some foreign areas, the UE may not have any cellular access and can only rely on Wi-Fi access for both data and voice calling. In those scenarios, the core network can no longer correlate the information in the cellular network to determine the location of the UE that performs Wi-Fi calling. FIG. 5 is a flowchart representation of a process 500 for wireless communication to independently determine the UE's IP address in the non-3GPP access network in accordance with one or more embodiments of the present technology. In addition, the process 500 can also be combined with the process 300 shown in FIG. 3 to arrive at a more robust determination of the UE's location. As shown in FIG. 5, the process 500 includes, at operation 510, transmitting, by a first network element in a home network (e.g., ePDG or N3IWF), a message to a second network element (e.g., PGW) indicating an establishment of a roaming voice session using a non-cellular network access technology (e.g., a roaming Wi-Fi call). The message includes an IP address allocated to a terminal device. The process 500 also includes, at operation 520, determining, by first the network element in the home network, a geographical location of the roaming voice session based on the IP address allocated to the terminal device. Alternatively, or in addition, the second network element can decide the geographical location of the voice session based on the IP address allocated to the terminal device. Details related to process 500 are described in following examples using the LTE system architecture (e.g., ePDG, PWG, Session Create/Bearer Create Request/Response, etc.). However, the discloses techniques are similarly appliable to 5G wireless communication systems (e.g., N3IWF, AMF, NAS signaling, etc.).

Figure 6:
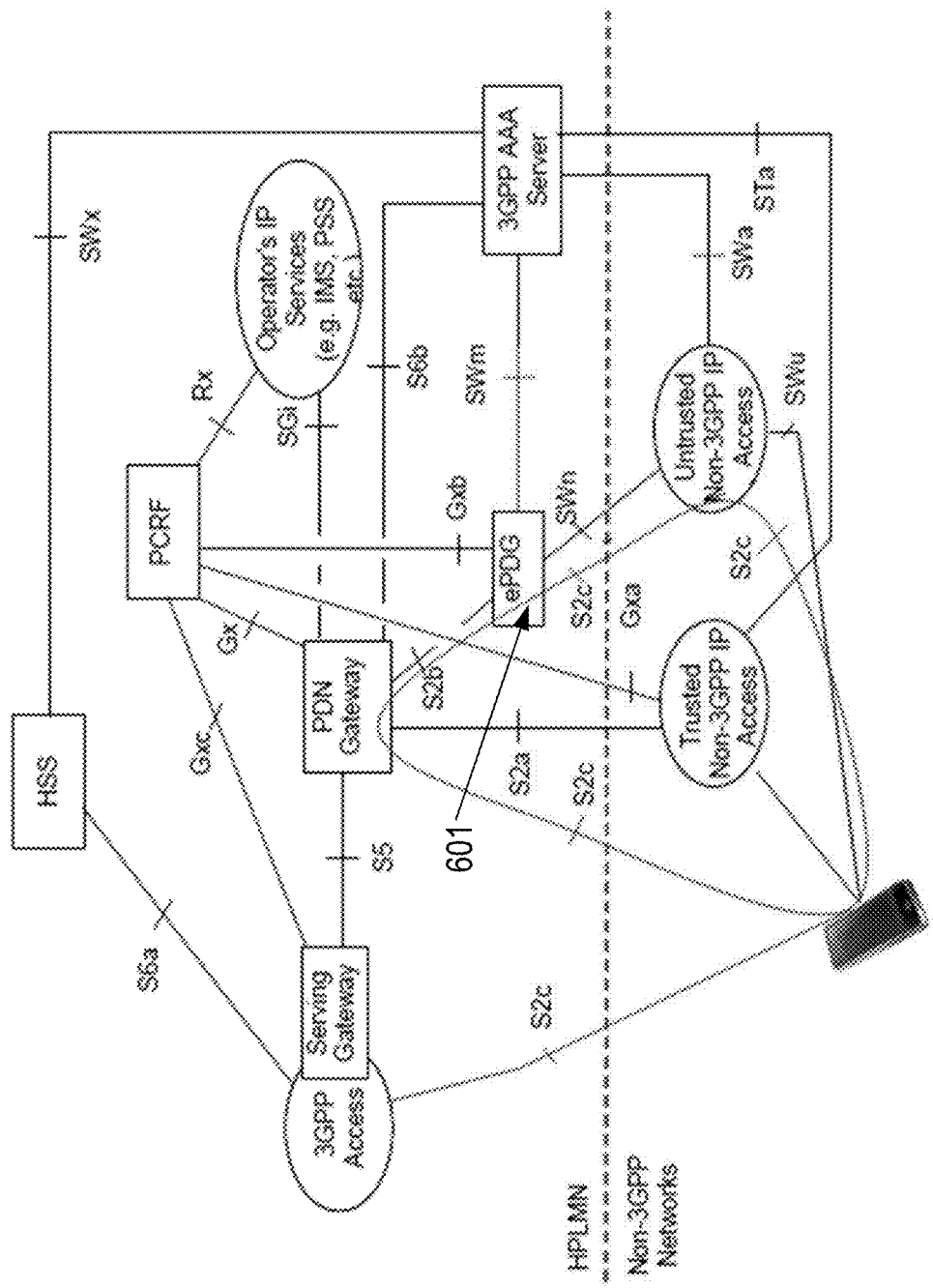
FIG. 6 illustrates an example architecture of untrusted non-3GPP access for HR scenario with evolved Packet Data Gateway (ePDG) in the home network in accordance with one or more embodiments of the present technology.

FIG. 6 illustrates an example architecture of untrusted non-3GPP access for HR scenario with ePDG in the home network in accordance with one or more embodiments of the present technology. In the LTE systems, the UE performs ePDG selection based on a set of information configured by the HPLMN in the UE and based on the UE's knowledge of the PLMN it is attached to. The UE can be configured with ePDG identifier configuration that identifies an ePDG in the HPLMN. It can further be configured with ePDG selection information that includes a prioritized list of PLMNs, including the HPLMN. When the UE determines that it is located in a country other than its home country, the UE can select an ePDG 601 in the HPLMN based on the configuration. The ePDG from home network is accessible via Domain Name System (DNS) interaction, much like the way how various internet addresses are resolved. In this case, WiFi calling devices can be pre-programmed with a Fully Qualified Domain Name (FQDN) that includes home country MCC, MNC, and/or DNS interaction so that the home country DNS server can find a way to route the call. Unresolved domain name can be escalated to higher layer DNS server distributed worldwide in internet architecture, again much like the same way routing is performed for other internet Uniform Resource Locators (URLs).

When an untrusted Non-3GPP IP access (e.g., Wi-Fi calling) is used, the UE is allocated an IP address by the untrusted Non-3GPP IP access network. The IP address is used by the UE get IP connectivity towards the ePDG. The ePDG can examine the UE's local IP address to determine the geolocation of the UE that is associated with the IP addresses. The ePDG can also transmit the UE Local IP address to the PGW.

Figure 7:
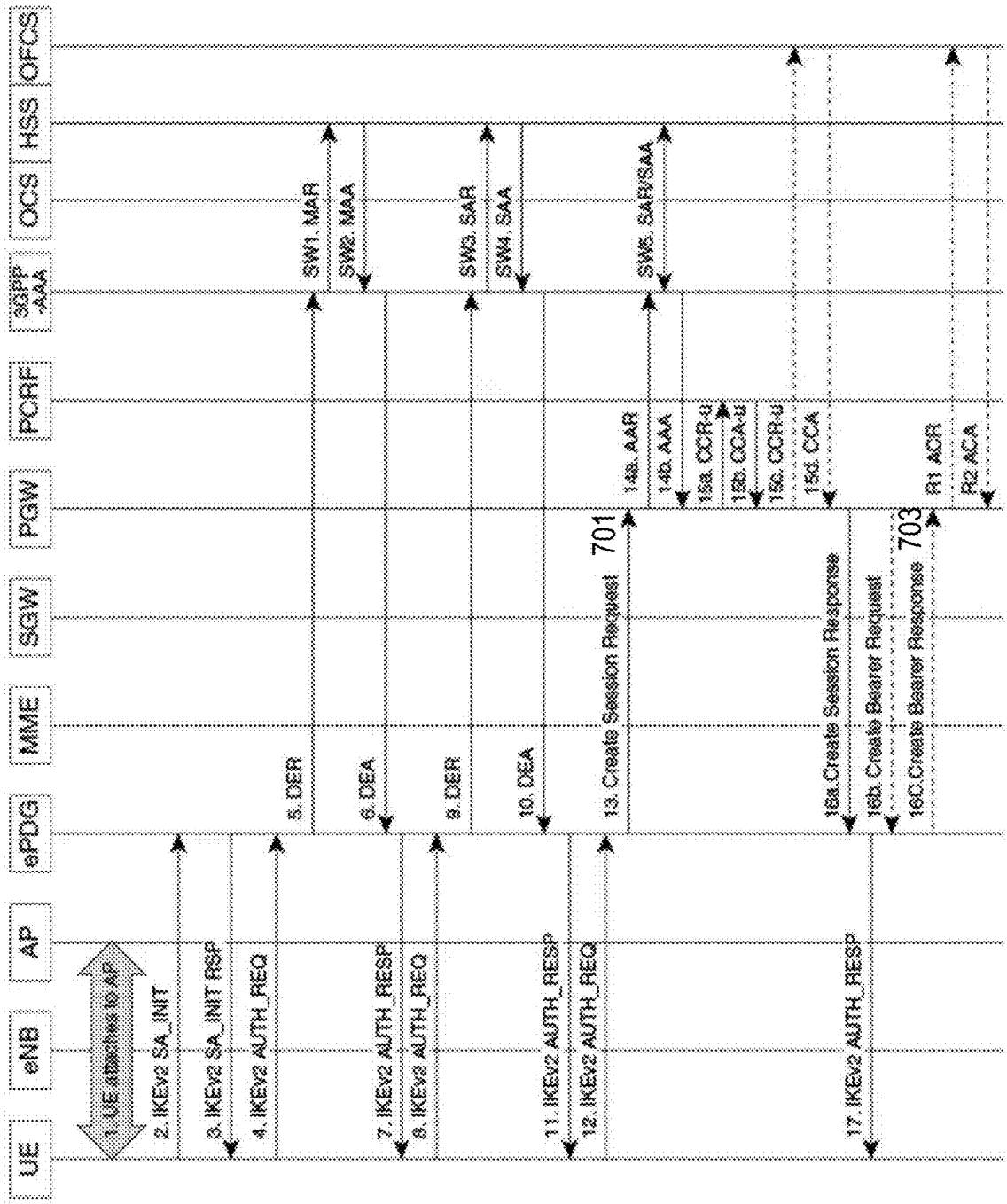
FIG. 7 is a sequence chart of signaling using Dedicated Bearer in accordance with one or more embodiments of the present technology.

FIG. 7 is a sequence chart of signaling using Dedicated Bearer in accordance with one or more embodiments of the present technology. In some embodiments, the ePDG can include UE Local IP Address in a Create Session Request message 701. The Create Session Request message 701 can be a GTP Create Session Request (CSREQ) message transmitted on S2b-c interface. Table 1 shows an example UE Local IP Address field included in a Create Session Request message.

TABLE 1

Example Information Element(s) in a Create Session Request

| Information Element | P | Condition/Comment | IE type | Ins. |
|---|---|---|---|---|
| UE Local IP Address | CO | The ePDG shall include this IE on the S2b interface during an Initial Attach for emergency session (GTP on S2b). Otherwise the ePDG shall include this IE on the S2b interface based on local policy | IP Address | 0 |
| UE UDP Port | CO | The ePDG shall include this IE on the S2b interface if NAT is detected, the UDP encapsulation is used and the UE Local IP Address is present. | Port Number | 0 |

In some embodiments, the ePDG can include the UE Local IP address in a Create Bearer Response message 703. Table 2 shows an example UE Local IP Address field included in a Create Bearer Response message.

TABLE 2

Example Information Element(s) in a Create Bearer Response

| Information Element | P | Condition/Comment | IE type | Ins. |
|---|---|---|---|---|
| UE Local IP Address | CO | The ePDG shall include this IE on the S2b interface. | IP Address | 0 |
| UE UDP Port | CO | The ePDG shall include this IE on the S2b interface if NAT is detected. | Port Number | 0 |

Given the UE's IP address, a mapping between the IP address(s) and geo-location(s) can be obtained by extracting the UE IP value from e-PDG transaction log and looking up the geolocation that corresponds to the IP value. For example, the ePDG can track the IP address of the UE associated with a call event when the PGW instructs the ePDG to set up a voice call user plane (e.g., using a Dedicated Bearer with QoS value of QCI-1). By tracking the locations of the call events from various UEs, the ePDG can identify which call events are made in which countries. As another example, the PWG can track the IP address of the UE by examining the signaling log from the ePDG. Upon determining that a voice call is set up, the PWG can identify in which country the voice call is made.

The location information (e.g., which country the voice call is made) can be associated with existing call metrices (e.g., call setup success rate, drop call rate, payload bytes, call setup time etc.) to provide performance analysis of roaming Wi-Fi calls on a per country basis. For example, given the geo-location of the UEs, the home network operator can provide accurate per-country call metrics for Wi-Fi roaming calls. Such information can further assist the home network operator to identify issues at the Internet Service Provider (ISP) level that can be unique to each country.

Wireless Communications System

Figure 8:
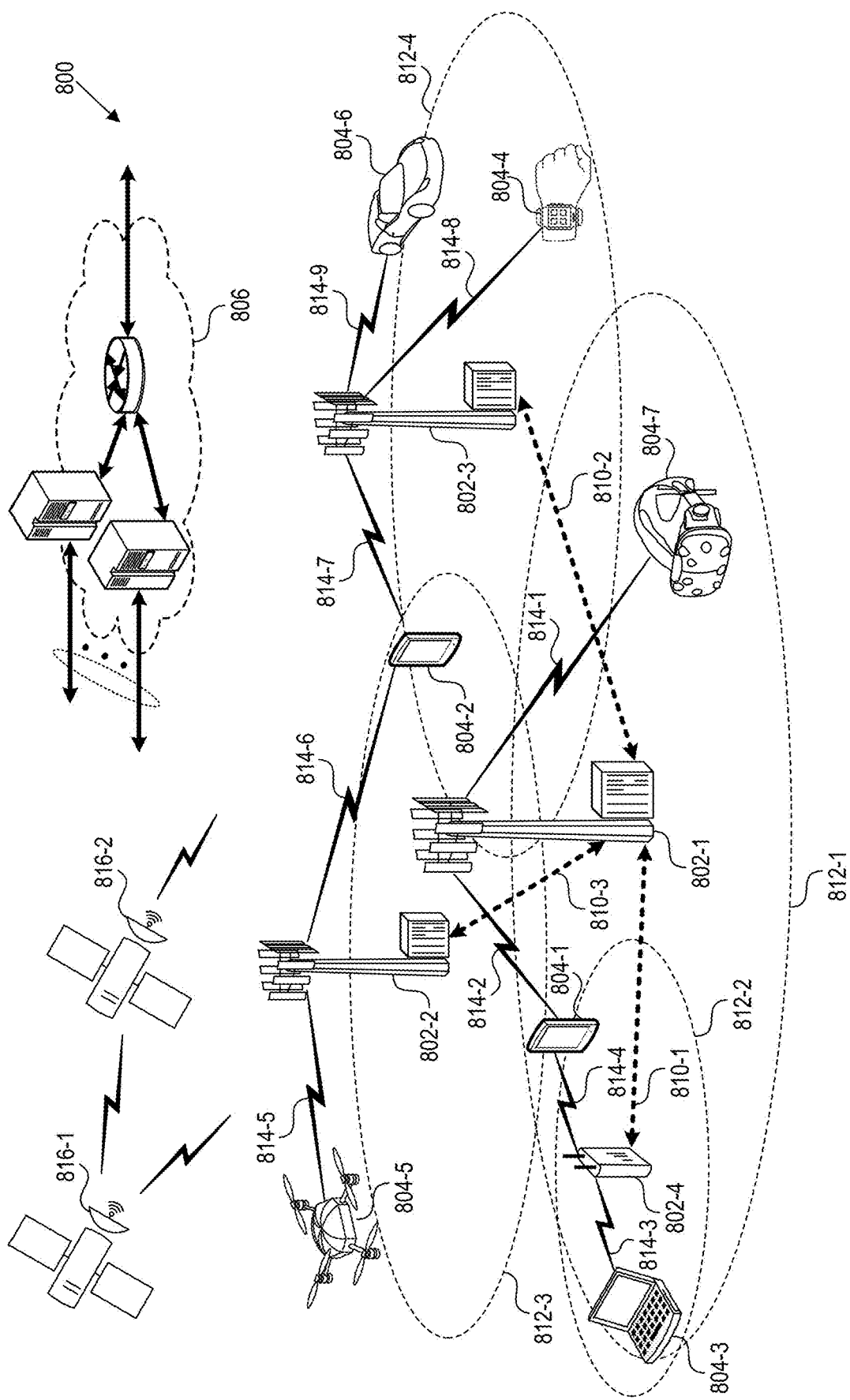
FIG. 8 is a diagram that illustrates a wireless telecommunication network in which aspects of the disclosed technology are incorporated.

FIG. 8 is a diagram that illustrates a wireless telecommunication network 800 ("network 800") in which aspects of the disclosed technology are incorporated. The network 800 includes base stations 802-1 through 802-4 (also referred to individually as "base station 802" or collectively as "base stations 802"). A base station is a type of network access node (NAN) that can also be referred to as a cell site, a base transceiver station, or a radio base station. The network 800 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 800 formed by the network 800 also include wireless devices 804-1 through 804-7 (referred to individually as "wireless device 804" or collectively as "wireless devices 804") and a core network 806. The wireless devices 804-1 through 804-7 can correspond to or include network entities capable of communication using various connectivity standards. For example, a 5G communication channel can use millimeter wave (mmW) access frequencies of 28 GHz or more. In some implementations, the wireless device 804 can operatively couple to a base station 802 over a long-term evolution/long-term evolution-advanced (LTE/LTE-A) communication channel, which is referred to as a 4G communication channel.

The core network 806 provides, manages, and controls security services, user authentication, access authorization, tracking, Internet Protocol (IP) connectivity, and other access, routing, or mobility functions. The base stations 802 interface with the core network 806 through a first set of backhaul links (e.g., S1 interfaces) and can perform radio configuration and scheduling for communication with the wireless devices 804 or can operate under the control of a base station controller (not shown). In some examples, the base stations 802 can communicate with each other, either directly or indirectly (e.g., through the core network 806), over a second set of backhaul links 810-1 through 810-3 (e.g., X1 interfaces), which can be wired or wireless communication links.

The base stations 802 can wirelessly communicate with the wireless devices 804 via one or more base station antennas. The cell sites can provide communication coverage for geographic coverage areas 812-1 through 812-4 (also referred to individually as "coverage area 812" or collectively as "coverage areas 812"). The geographic coverage area 812 for a base station 802 can be divided into sectors making up only a portion of the coverage area (not shown). The network 800 can include base stations of different types (e.g., macro and/or small cell base stations). In some implementations, there can be overlapping geographic coverage areas 812 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 800 can include a 5G network and/or an LTE/LTE-A or other network. In an LTE/LTE-A network, the term eNB is used to describe the base stations 802, and in 5G new radio (NR) networks, the term gNBs is used to describe the base stations 802 that can include mmW communications. The network 800 can thus form a heterogeneous network in which different types of base stations provide coverage for various geographic regions. For example, each base station 802 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 800 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 804 and the base stations 802 or core network 806 supporting radio bearers for the user plane data. At the Physical (PHY) layer, the transport channels are mapped to physical channels.

Wireless devices can be integrated with or embedded in other devices. As illustrated, the wireless devices 804 are distributed throughout the system, where each wireless device 804 can be stationary or mobile. For example, wireless devices can include handheld mobile devices 804-1 and 804-2 (e.g., smartphones, portable hotspots, tablets, etc.); laptops 804-3; wearables 804-4; drones 804-5; vehicles with wireless connectivity 804-6; head-mounted displays with wireless augmented reality/virtual reality (ARNR) connectivity 804-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 804-1, 804-2, 804-3, 804-4, 804-5, 804-6, and 804-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 800 equipment at the edge of a network 800 including macro eNBs/gNBs, small cell eNBs/ gNBs, relay base stations, and the like. A wireless device can also communicate with other wireless devices either within or outside the same coverage area of a base station via device-to-device (D2D) communications.

The communication links 814-1 through 814-9 (also referred to individually as "communication link 814" or collectively as "communication links 814") shown in network 800 include uplink (UL) transmissions from a wireless device 804 to a base station 802, and/or downlink (DL) transmissions from a base station 802 to a wireless device 804. The downlink transmissions can also be called forward link transmissions while the uplink transmissions can also be called reverse link transmissions. Each communication link 814 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 814 can transmit bidirectional communications using frequency division duplex (FDD) (e.g., using paired spectrum resources) or Time division duplex (TDD) operation (e.g., using unpaired spectrum resources). In some implementations, the communication links 814 include LTE and/or mmW communication links.

In some implementations of the network 800, the base stations 802 and/or the wireless devices 804 include multiple antennas for employing antenna diversity schemes to improve communication quality and reliability between base stations 802 and wireless devices 804. Additionally or alternatively, the base stations 802 and/or the wireless devices 804 can employ multiple-input, multiple-output (MIMO) techniques that can take advantage of multi-path environments to transmit multiple spatial layers carrying the same or different coded data.

In some examples, the network 800 implements 6G technologies including increased densification or diversification of network nodes. The network 800 can enable terrestrial and non-terrestrial transmissions. In this context, a Non-Terrestrial Network (NTN) is enabled by one or more satellites such as satellites 816-1 and 816-2 to deliver services anywhere and anytime and provide coverage in areas that are unreachable by any conventional Terrestrial Network (TN). A 6G implementation of the network 800 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 800 can implement a converged Radio Access Network (RAN) and Core architecture to achieve Control and User Plane Separation (CUPS) and achieve extremely low User Plane latency. In yet another example of 6G, the network 800 can implement a converged Wi-Fi and Core architecture to increase and improve indoor coverage.

Computer System

Figure 9:
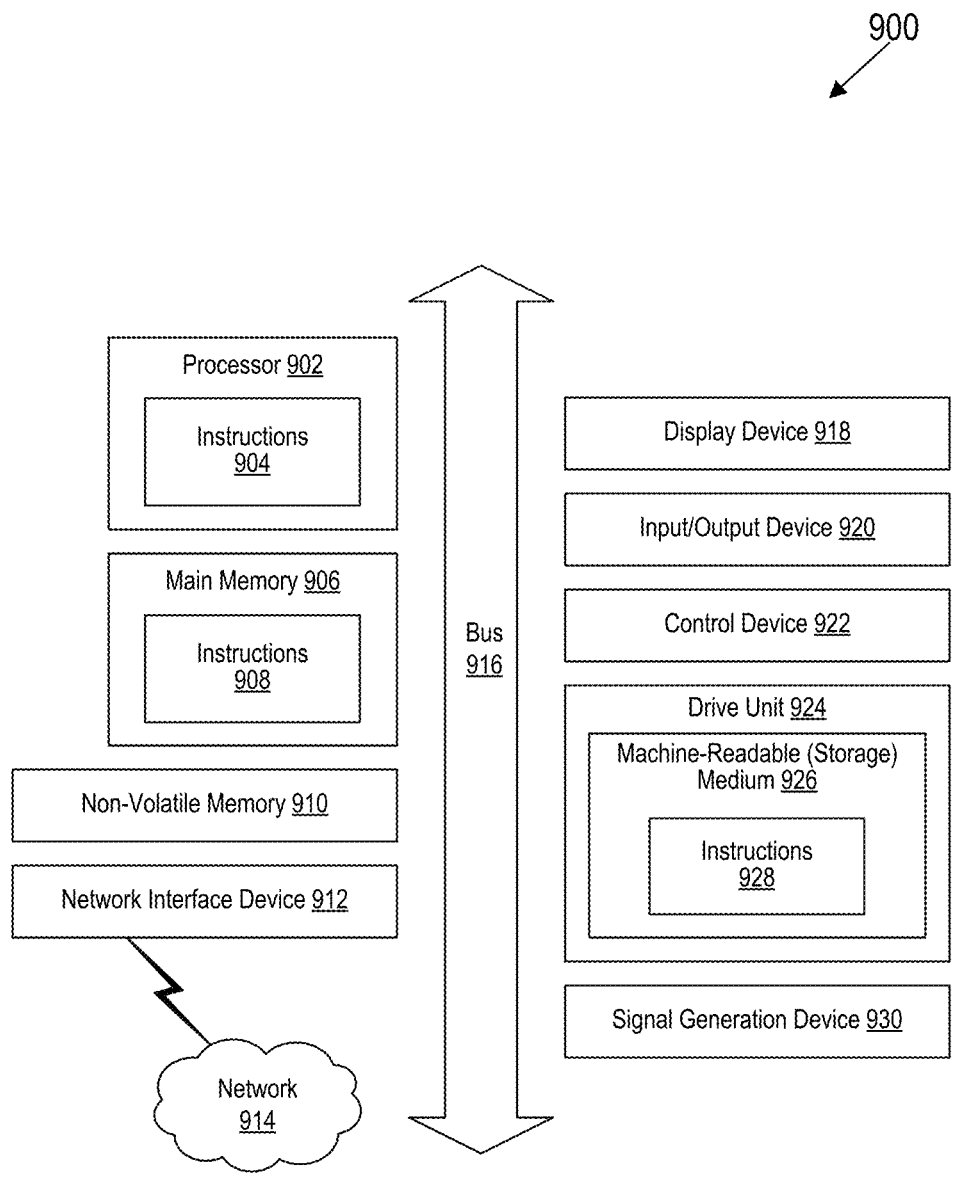
FIG. 9 is a block diagram that illustrates an example of a computer system in which at least some operations described herein can be implemented.

FIG. 9 is a block diagram that illustrates an example of a computer system 900 in which at least some operations described herein can be implemented. As shown, the computer system 900 can include: one or more processors 902, main memory 906, non-volatile memory 910, a network interface device 912, video display device 918, an input/output device 920, a control device 922 (e.g., keyboard and pointing device), a drive unit 924 that includes a storage medium 926, and a signal generation device 930 that are communicatively connected to a bus 916. The bus 916 represents one or more physical buses and/or point-to-point connections that are connected by appropriate bridges, adapters, or controllers. Various common components (e.g., cache memory) are omitted from FIG. 9 for brevity. Instead, the computer system 900 is intended to illustrate a hardware device on which components illustrated or described relative to the examples of the figures and any other components described in this specification can be implemented.

The computer system 900 can take any suitable physical form. For example, the computing system 900 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 900. In some implementation, the computer system 900 can be an embedded computer system, a system-on-chip (SOC), a single-board computer system (SBC) or a distributed system such as a mesh of computer systems or include one or more cloud components in one or more networks. Where appropriate, one or more computer systems 900 can perform operations in real-time, near real-time, or in batch mode.

The network interface device 912 enables the computing system 900 to mediate data in a network 914 with an entity that is external to the computing system 900 through any communication protocol supported by the computing system 900 and the external entity. Examples of the network interface device 912 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 906, non-volatile memory 910, machine-readable medium 926) can be local, remote, or distributed. Although shown as a single medium, the machine-readable medium 926 can include multiple media (e.g., a centralized/distributed database and/or associated caches and servers) that store one or more sets of instructions 928. The machine-readable (storage) medium 926 can include any medium that is capable of storing, encoding, or carrying a set of instructions for execution by the computing system 900. The machine-readable medium 926 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 910, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 904, 908, 928) set at various times in various memory and storage devices in computing device(s). When read and executed by the processor 902, the instruction(s) cause the computing system 900 to perform operations to execute elements involving the various aspects of the disclosure.

Remarks

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

I claim:

1. A method for wireless communication, comprising:
   transmitting, by a first network element in a home network, a message to a second network element indicating an establishment of a roaming voice session for a terminal device in a visited network using a non-cellular network access technology, wherein the first network element comprises an evolved Packet Data Gateway (ePDG) or a Non-3GPP Interworking Function (N3IWF), wherein the message includes an Internet Protocol (IP) address in the visited network allocated to the terminal device; and determining, by the home network, a geographical location of the roaming voice session associated with the terminal device in the visited network based on the IP address in the visited network allocated to the terminal device.

2. The method of claim 1, further comprising:
transmitting, by the home network, configuration information to the terminal device to enable the terminal device to select the first network element in the home network for the establishment of the roaming voice session in the visited network using the non-cellular network access technology.

3. The method of claim 1, wherein the second network element comprises a Packet Data Network Gateway (PGW).

4. The method of claim 1, wherein the message comprises a Create Session Request.

5. The method of claim 1, wherein the message comprises a Create Bearer Response.

6. The method of claim 1, wherein the message comprises a Non-Access Stratum (NAS) signaling message.

7. The method of claim 1, comprising:
receiving, by the home network, information associated with multiple roaming voice sessions using the non-cellular network access technology;
determining, by the home network, different geographical locations for the multiple roaming voice sessions; and
analyzing, by the home network, usage pattern of the non-cellular network access technology in respective geographical locations.

8. A system for wireless communication in a home network, comprising:
a first network element configured to:
transmit a message indicating an establishment of a roaming voice session for a terminal device in a visited network using a non-cellular network access technology,
wherein the first network element comprises an evolved Packet Data Gateway (ePDG) or a Non-3GPP Interworking Function (N3IWF),
wherein the message includes an Internet Protocol (IP) address in the visited network allocated to the terminal device; and
a second network element configured to:
determine a geographical location of the roaming voice session associated with the terminal device in the visited network based on the IP address allocated to the terminal device.

9. The system of claim 8, comprising:
a third network element configured to:
transmit configuration information to the terminal device to enable the terminal device to select the first network element in the home network for the establishment of the roaming voice session in the visited network using the non-cellular network access technology.

10. The system of claim 8, wherein the second network element comprises a Packet Data Network Gateway (PGW).

11. The system of claim 8, wherein the message comprises a Create Session Request.

12. The system of claim 8, wherein the message comprises a Create Bearer Response.

13. The system of claim 8, wherein the message comprises a Non-Access Stratum (NAS) signaling message.

14. The system of claim 8, further comprising:
a fourth network element configured to:
analyze usage pattern of the non-cellular network access technology in respective geographical locations.

15. A method for wireless communication, comprising:
receiving, by a network element in a home network, a first set of information from a first network node in a first visited network, wherein the first set of information is associated with a data access by a terminal device in a visited network using a cellular network access technology;
receiving, by the network element in the home network, a second set of information from a second network node, wherein the second set of information is associated with a roaming voice session by the terminal device in the visited network using a non-cellular network access technology;
determining, by the network element in the home network, that the first set of information is correlated with the second set of information; and
determining a geographical location of the roaming voice session associated with the terminal device in the visited network based on the first set of information associated with the data access by the terminal device.

16. The method of claim 15, wherein the network element in the home network comprises a Packet Data Network Gateway (PGW) or a User Plane Function (UPF).

17. The method of claim 15, wherein the second network node is same as the first network node in the first visited network.

18. The method of claim 15, wherein the second network node is in a second visited network.

19. The method of claim 15, wherein the second network node is in the home network.

20. The method of claim 15, wherein the first set of information is determined to be correlated with the second set of information based on an identifier of the terminal device or a temporal proximity of the first set of information and the second set of information.

* * * * *